(12) United States Patent
Nariyama et al.

(10) Patent No.: US 10,497,348 B2
(45) Date of Patent: Dec. 3, 2019

(54) EVALUATION DEVICE AND EVALUATION METHOD

(71) Applicant: YAMAHA CORPORATION, Hamamatsu-shi (JP)

(72) Inventors: Ryuichi Nariyama, Hamamatsu (JP); Tatsuya Terashima, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 76 days.

(21) Appl. No.: 15/894,291

(22) Filed: Feb. 12, 2018

(65) Prior Publication Data

US 2018/0174561 A1    Jun. 21, 2018

Related U.S. Application Data

(63) Continuation of application No. PCT/JP2016/076135, filed on Sep. 6, 2016.

(30) Foreign Application Priority Data

Sep. 15, 2015   (JP) .................................. 2015-181642

(51) Int. Cl.
   *G10H 1/36*       (2006.01)
   *G10H 1/40*       (2006.01)
   (Continued)

(52) U.S. Cl.
   CPC .............. *G10H 1/361* (2013.01); *G10H 1/40* (2013.01); *G09B 15/00* (2013.01); *G09B 19/00* (2013.01);
   (Continued)

(58) Field of Classification Search
   CPC .......... G10H 1/361; G10H 1/40; G09B 15/00; G09B 19/00; G10L 25/51; G10L 25/90
   (Continued)

(56) References Cited

U.S. PATENT DOCUMENTS 5,455,378 A * 10/1995 Paulson ................. G10H 1/361
                                                    84/610
6,151,571 A * 11/2000 Pertrushin .............. G10L 17/26
                                                    704/207
(Continued)

FOREIGN PATENT DOCUMENTS

JP       2004102148 A    4/2004
JP       2005107087 A    4/2005
(Continued)

OTHER PUBLICATIONS

International Search Report issued in Intl. Appln. No. PCT/JP2016/076135 dated Nov. 22, 2016. English translation provided.
(Continued)

*Primary Examiner* — David S Warren
*Assistant Examiner* — Christina M Schreiber
(74) *Attorney, Agent, or Firm* — Rossi, Kimms & McDowell LLP

(57) ABSTRACT

An evaluation device according to an embodiment includes an acquisition unit acquiring an input sound; a feature value calculation unit calculating a feature value from the input sound acquired by the acquisition unit; a detection unit detecting a break position corresponding to a starting point of each sound included in the input sound acquired by the acquisition unit based on the feature value calculated by the feature value calculation unit; and an evaluation value calculation unit calculating, based on a plurality of break positions detected by the detection unit, an evaluation value regarding a degree of temporal regularity of the plurality of break positions.

16 Claims, 7 Drawing Sheets

(51) Int. Cl.
*G09B 15/00* (2006.01)
*G09B 19/00* (2006.01)
*G10L 25/51* (2013.01)
*G10L 25/90* (2013.01)

(52) U.S. Cl.
CPC .................................................................
*G10H 2210/005* (2013.01); *G10H 2210/066* (2013.01); *G10H 2210/091* (2013.01); *G10L 25/51* (2013.01); *G10L 25/90* (2013.01)

(58) Field of Classification Search
USPC ........................................................ 84/634
See application file for complete search history.

(56) References Cited

U.S. PATENT DOCUMENTS

| | | | | |
|---|---|---|---|---|
| 8,964,998 B1* | 2/2015 | McClain | ........... | H03G 3/32 381/106 |
| 2003/0138110 A1* | 7/2003 | Sato | ........... | G10L 19/018 381/61 |
| 2008/0034948 A1* | 2/2008 | Sumita | ........... | G10H 1/0008 84/636 |
| 2008/0304672 A1* | 12/2008 | Yoshizawa | ........... | G08G 1/017 381/56 |
| 2009/0019994 A1* | 1/2009 | McKinney | ........... | G10H 1/40 84/612 |
| 2010/0142715 A1* | 6/2010 | Goldstein | ........... | G06F 16/686 381/56 |
| 2010/0153101 A1* | 6/2010 | Fernandes | ........... | G10L 17/26 704/220 |
| 2012/0192701 A1* | 8/2012 | Watanabe | ........... | G10H 1/40 84/622 |
| 2014/0260912 A1* | 9/2014 | Maezawa | ........... | G10H 1/40 84/612 |
| 2015/0106095 A1* | 4/2015 | Mitchell | ........... | G10L 25/51 704/236 |
| 2018/0174561 A1* | 6/2018 | Nariyama | ........... | G10H 1/361 |
| 2018/0204588 A1* | 7/2018 | Nariyama | ........... | G10L 25/60 |
| 2018/0240448 A1* | 8/2018 | Nariyama | ........... | G10L 25/51 |
| 2018/0277144 A1* | 9/2018 | Nariyama | ........... | G10H 1/0008 |
| 2018/0357920 A1* | 12/2018 | Terashima | ........... | G10G 7/02 |

FOREIGN PATENT DOCUMENTS

| | | |
|---|---|---|
| JP | 2005107334 A | 4/2005 |
| JP | 2007519048 A | 7/2007 |
| JP | 2008132088 A | 6/2008 |
| JP | 2008225115 A | 9/2008 |
| JP | 2008268370 A | 11/2008 |
| JP | 2009233339 A | 10/2009 |
| JP | 2013190564 A | 9/2013 |

OTHER PUBLICATIONS

Written Opinion issued in Intl. Appln. No. PCT/JP2016/076135 dated Nov. 22, 2016.

English translation of Written Opinion issued in Intl. Appln. No. PCT/JP2016/076135 dated Nov. 22, 2016.

Office Action issued in Japanese Appln. No. 2015-181642 dated Jul. 9, 2019. English translation provided.

* cited by examiner

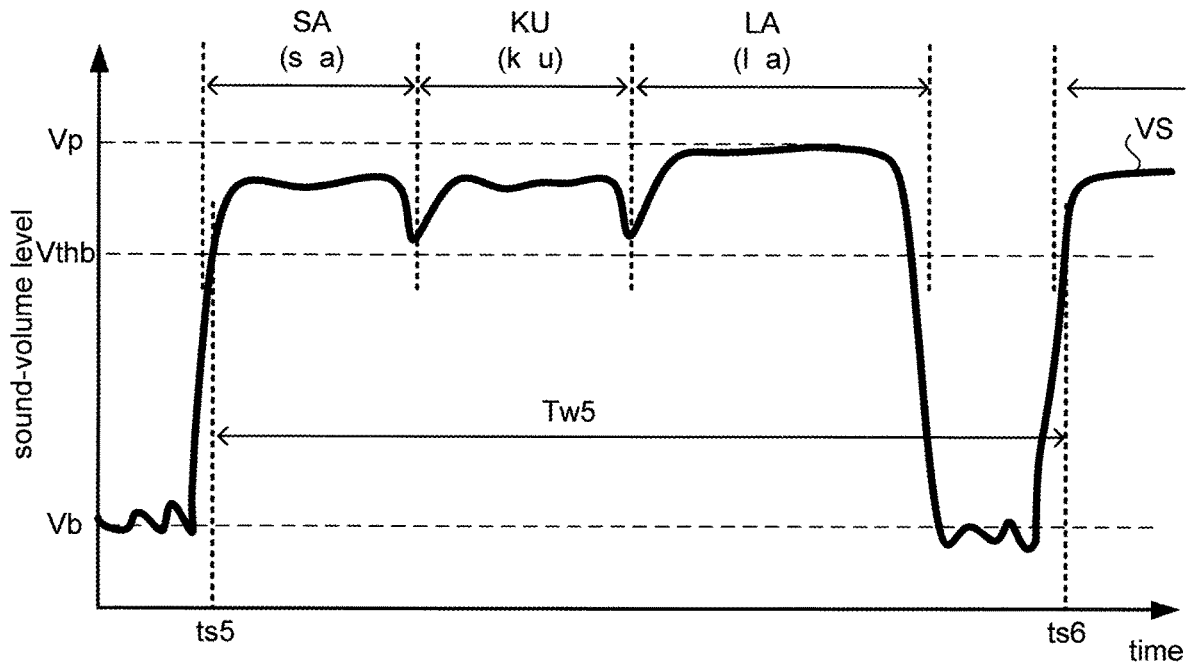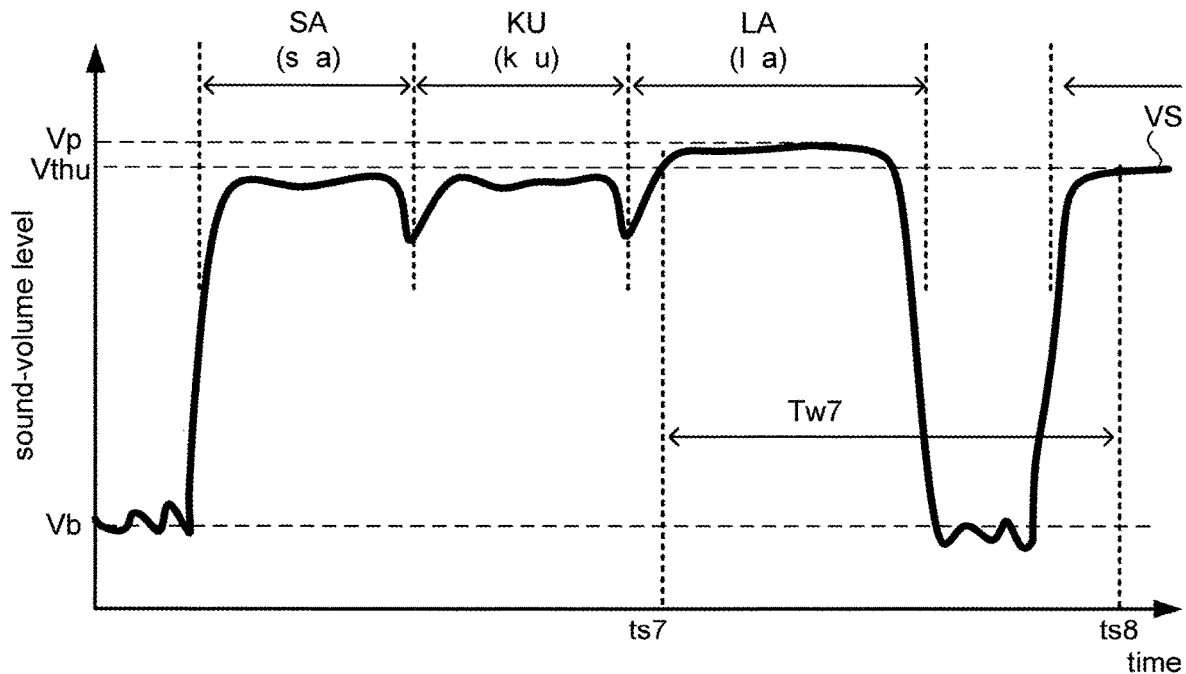

EVALUATION DEVICE AND EVALUATION METHOD

This application is a U.S. continuation application filed under 35 U.S.C. § 111(a), of International Application No. PCT/JP2016/076135, filed on Sep. 6, 2016, which claims priority to Japanese Patent Application No. 2015-181642, filed on Sep. 15, 2015, the disclosures of which are incorporated by reference.

FIELD

The present invention relates to a technique of evaluating a sense of rhythm.

BACKGROUND

Karaoke devices with a function of analyzing a singing voice for evaluation have been increasing. For example, a pitch of the singing voice and a pitch of a melody to be sung are compared and the singing voice is evaluated based on the degree of matching between these pitches. Also, by using various methods, more accurate evaluation can be made. As one of the various evaluation methods, for example, a technique of evaluating singing of a musical piece in which a sense of rhythm is weighed has been developed (for example, Japanese Patent Application Laid-Open No. 2013-190564).

In the technique disclosed in Japanese Patent Application Laid-Open No. 2013-190564, evaluation of the sense of rhythm is made by comparing feature values between a voice as a model for a musical piece and a singing voice. According to this evaluation, evaluation of whether singing close to the model sound of the musical piece has been performed can be made from the point of view of the sense of rhythm. On the other hand, it is also desired that evaluation of the sense of rhythm be made without a model sound.

SUMMARY

According to one embodiment of the present invention, provided is an evaluation device including an acquisition unit acquiring an input sound, a feature value calculation unit calculating a feature value from the input sound acquired by the acquisition unit, a detection unit detecting a break position corresponding to a starting point of each sound included in the input sound acquired by the acquisition unit based on the feature value calculated by the feature value calculation unit, and an evaluation value calculation unit calculating, based on a plurality of break positions detected by the detection unit, an evaluation value regarding a degree of temporal regularity of the plurality of break positions.

Also, according to one embodiment of the present invention, provided is an evaluation method including acquiring an input sound, calculating a feature value from the acquired input sound, detecting a break position corresponding to a starting point of each sound included in the acquired input sound based on the calculated feature value, and calculating, based on a plurality of said break points, an evaluation value regarding a degree of temporal regularity of the plurality of break positions.

BRIEF DESCRIPTION OF THE DRAWINGS

FIG. 5 is a diagram describing an example in which a threshold is low in the evaluation method in the first embodiment of the present invention;

FIG. 6 a diagram describing an example in which the threshold is high in the evaluation method in the first embodiment of the present invention;

DESCRIPTION OF EMBODIMENTS

Figure 1:
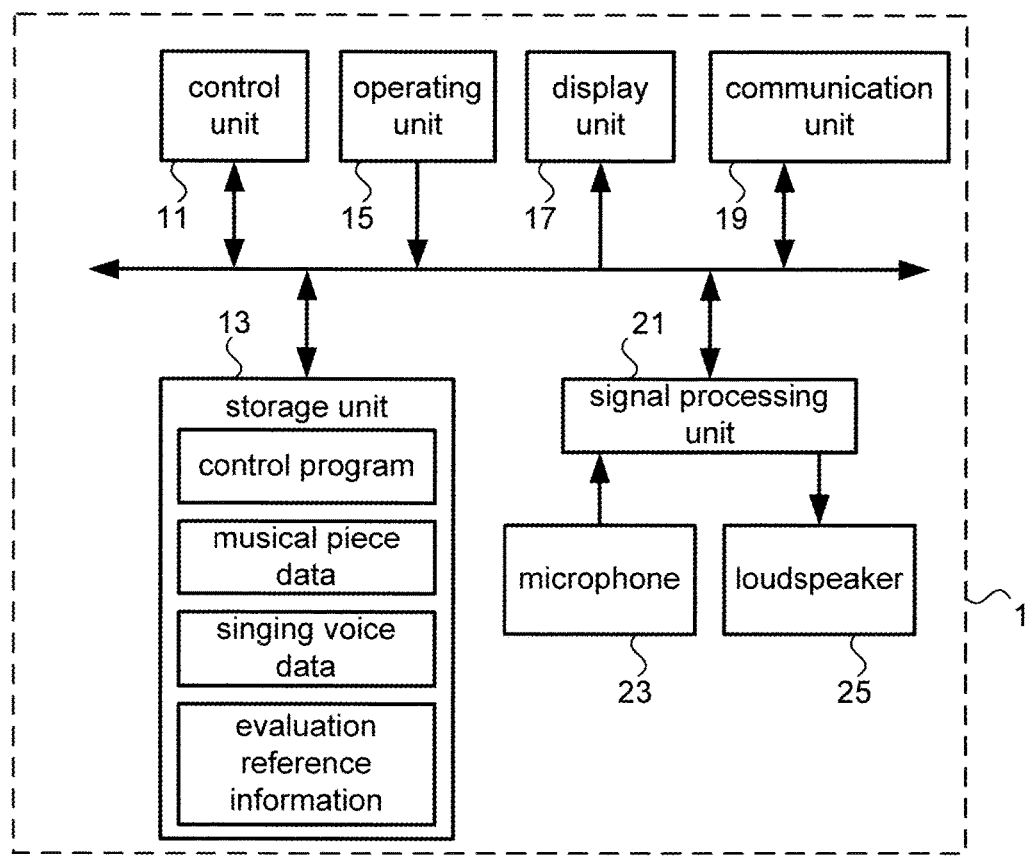
FIG. 1 is a block diagram depicting the structure of an evaluation device in a first embodiment of the present invention.

In the following, an evaluation device in one embodiment of the present invention is described in detail with reference to the drawings. Embodiments described below are each merely one example of embodiments of the present invention, and the present invention is not limited to these embodiments. Note that in the drawings which are referred to in the present embodiment, identical portions or portions with similar functions are provided with the same sign or a similar sign (a sign only with A, B, or the like provided after a numeral) and their repetitive description may be omitted.

First Embodiment

An evaluation device in a first embodiment of the present invention is described in detail with reference to the drawings. The evaluation device according to the first embodiment is a device which evaluates a sense of rhythm of a singing voice of a singing user (which may be hereinafter referred to as a singer). This evaluation device can evaluate a sense of rhythm of the singing voice even without a voice as a model in a musical piece to be sung. This evaluation device is described below.

[Hardware]

FIG. 1 is a block diagram depicting the structure of the evaluation device in the first embodiment of the present invention. An evaluation device 1 is, for example, a karaoke device. Note that the device may be a portable device such as a smartphone. The evaluation device 1 includes a control unit 11, a storage unit 13, an operating unit 15, a display unit 17, a communication unit 19, and a signal processing unit 21. Each of these structures are connected via a bus. Also, a microphone 23 and a loudspeaker 25 are connected to the signal processing unit 21.

The control unit 11 includes an arithmetic operation processing circuit such as a CPU. In the control unit 11, a control program stored in the storage unit 13 is executed by the CPU to achieve various functions in the evaluation device 1. The functions to be achieved include a function of evaluating a sense of rhythm of a singing voice (which may be hereinafter referred to as a rhythm evaluation function). The storage unit 13 is a storage device such as a non-volatile memory or hard disk. The storage unit 13 stores the control program for achieving the rhythm evaluation function. The control program is required to be executable by a computer and may be provided in a state of being stored in a computer-readable recording medium such as a magnetic recording medium, optical recording medium, opto-magnetic recording medium, or semiconductor memory. In this case, the evaluation device 1 is required to include a device of reading the recording medium. Also, the control program may be downloaded via a network.

Also, as data regarding singing, the storage unit 13 has stored therein musical piece data, singing voice data, and evaluation reference information. The musical piece data includes data in relation to a singing musical piece of karaoke, for example, guide melody data, accompaniment data, and song lyrics data. The guide melody data is data indicating a melody of a singing musical piece. The accompaniment data is data indicating an accompaniment of the singing musical piece. The guide melody data and the accompaniment data may be data represented in MIDI format. The song lyrics data is data for causing song lyrics of the singing musical piece to be displayed and data indicating a timing of color switching of a displayed song lyrics telop. These pieces of data may be acquired from an external server. The singing voice data is data indicating a singing voice inputted by the singer from the microphone 23. In this example, the singing voice data is buffered in the storage unit 13 until the singing voice is evaluated by a rhythm evaluation function. The evaluation reference information is information for the rhythm evaluation function to use as a reference of evaluation of a singing voice. For example, information which defines a rule for determining a threshold, which will be described further below, information about an arithmetic expression for calculating an evaluation value, and so forth are included.

The operating unit 15 has devices such as an operation button, keyboard, and mouse provided on an operation panel, remote controller, and so forth, outputting a signal to the control unit 11 in accordance with inputted operation. This operating unit 15 enables input operation generally performed in a karaoke device, for example, selecting a musical piece. The display unit 17 is a display device such as a liquid-crystal display or organic EL display, where a screen based on the control by the control unit 11 is displayed. Note that the operating unit 15 and the display unit 17 may integrally configure a touch panel. The communication unit 19 is connected to a communication line such as the Internet to transmit and receive information to and from an external device such as a server. Note that the function of the storage unit 13 may be achieved by an external device communicable at the communication unit 19.

The signal processing unit 21 includes a sound source which generates an audio signal from a MIDI-format signal, an A/D converter, a D/A converter, and so forth. The singing voice is converted into an electrical signal at the microphone 23, is inputted to the signal processing unit 21, is subjected to A/D conversion at the signal processing unit 21, and is outputted to the control unit 11. As described above, the singing voice is buffered in the storage unit 13 as singing voice data. Also, the accompaniment data is read by the control unit 11, is subjected to D/A conversion at the signal processing unit 21, and is outputted from the loudspeaker 25 as an accompaniment of the singing musical piece. Here, a guide melody may be outputted from the loudspeaker 25.

[Rhythm Evaluation Function]

The rhythm evaluation function achieved by the control unit 11 of the evaluation device 1 executing the control program is described. Note that the entire or part of the structure achieved by the rhythm evaluation function described below may be achieved by hardware.

Figure 2:
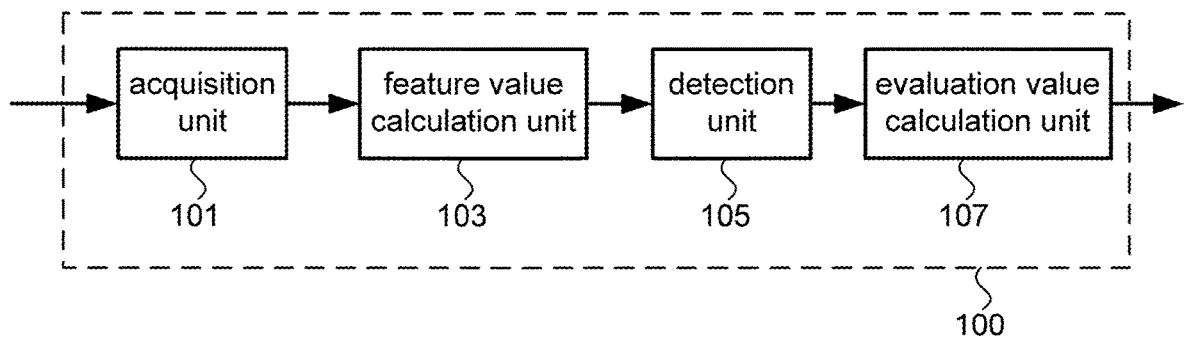
FIG. 2 is a block diagram depicting the structure of a rhythm evaluation function in the first embodiment of the present invention.

FIG. 2 is a block diagram depicting the structure of the rhythm evaluation function in the first embodiment of the present invention. A rhythm evaluation function 100 includes an acquisition unit 101, a feature value calculation unit 103, a detection unit 105, and an evaluation value calculation unit 107. The acquisition unit 101 acquires singing voice data indicating a singing voice inputted from the microphone 23. In this example, an input sound to the microphone 23 in a period during which an accompaniment sound is being outputted is recognized as a singing voice of an evaluation target. Note that the acquisition unit 101 acquires the singing voice data buffered in the storage unit 13. This may be performed after the singing voice data for the entire musical piece is stored in the storage unit 13 or after the singing voice data for a predetermined time is buffered. Also, the acquisition unit 101 is not limited to acquire the singing voice data indicating an input sound to the microphone 23 but may also acquire the singing voice data indicating an input sound to an external device via a network through the communication unit 19.

The feature value calculation unit 103 analyzes the singing voice data acquired by the acquisition unit 101 and calculates a temporal change of a feature value. In this example, the feature value is a sound-volume level of the singing voice.

The detection unit 105 detects a break position corresponding to a starting point of each sound included in the singing voice, based on the sound-volume level calculated at the feature value calculation unit 103. Each sound corresponds to, for example, a sound emission of each character of song lyrics. Also, in this example, the starting point of each sound corresponds to a timing of switching from a consonant to a vowel, that is, a portion where a vowel starts. A break position corresponding to the starting point of each sound is not limited to match this starting point, but is a position determined by a predetermined process based on the starting point.

In Japanese, when a sound is emitted as a combination of a consonant and a vowel, the sound-volume level in a consonant emission period tends to be smaller than the sound-volume level in a vowel emission period. This tendency is not limited to the case in which a sound of one character is singly emitted but is seen also in the case in which sounds of a plurality of characters are consecutively emitted. Using this feature, the detection unit 105 detects a break position corresponding to the starting point of each sound.

Figure 3:
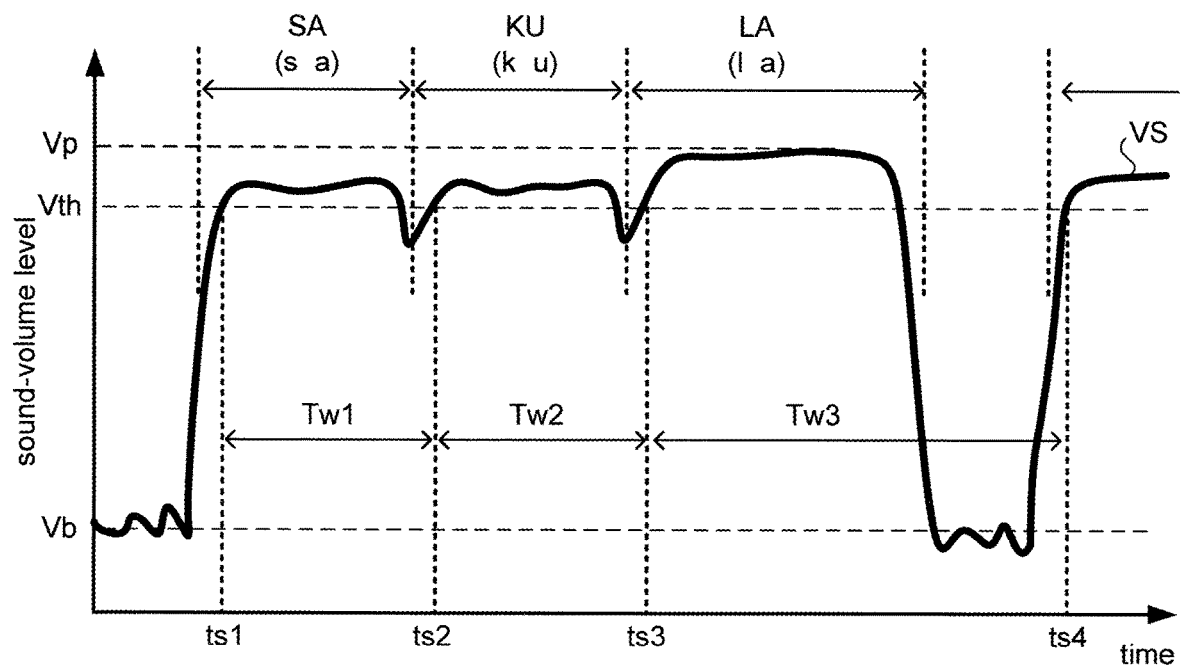
FIG. 3 is a diagram describing an evaluation method in the first embodiment of the present invention.

FIG. 3 is a diagram describing an evaluation method in the first embodiment of the present invention. Here, temporal changes of the sound-volume level are exemplarily depicted when characters of "sa (consonant "s"+vowel "a")", "ku (consonant "k"+vowel "u")", and "ra (consonant "r"+vowel "a")" are sung. These sound-volume changes are represented by a spectrum VS depicted in FIG. 3. This time indicates a time elapsed after a singing voice is inputted (from a timing of starting evaluation). For any sound emission of a character, a tendency of the sound-volume level to decrease in a consonant emission period can be seen.

Even when sounds of a plurality of characters are consecutively emitted, the detection unit 105 detects a break position by using a portion in which the sound-volume level decreases in a consonant portion as described above. In this example, the detection unit 105 determines a threshold Vth of the sound-volume level and detects a point where the level makes a transition from a lower level to a higher level than Vth as a break position. In the example of FIG. 3, break positions are detected as times ts1, ts2, ts3, . . . Vth may be any sound-volume level determined in advance and, in this example, is determined based on a background level Vb of the sound-volume level and a maximum level Vp of the sound-volume level. It is only required that the threshold be determined by a predetermined arithmetic expression, for example, Vth=Vp×0.9(Vp−Vb) when dB is set as a unit. In this example, Vp is a maximum value of the sound-volume level in the entire musical piece. Note that one musical piece may be divided into a plurality of evaluation sections and Vth may be changed so as to correspond to each evaluation section by following a rule determined in advance. In this case, it is only required that Vth be determined by using Vb and Vp for each evaluation section.

Referring back to FIG. 2, description continues. The evaluation value calculation unit 107 calculates an evaluation value regarding the degree of regularity (temporal regularity) of the plurality of break positions detected by the detection unit 105. In this example, the evaluation value calculation unit 107 calculates a frequency distribution of time intervals between adjacent break positions and calculates an evaluation value based on that distribution. These time intervals correspond to Tw1, Tw2, and Tw3 in the example of FIG. 3.

Figure 4:
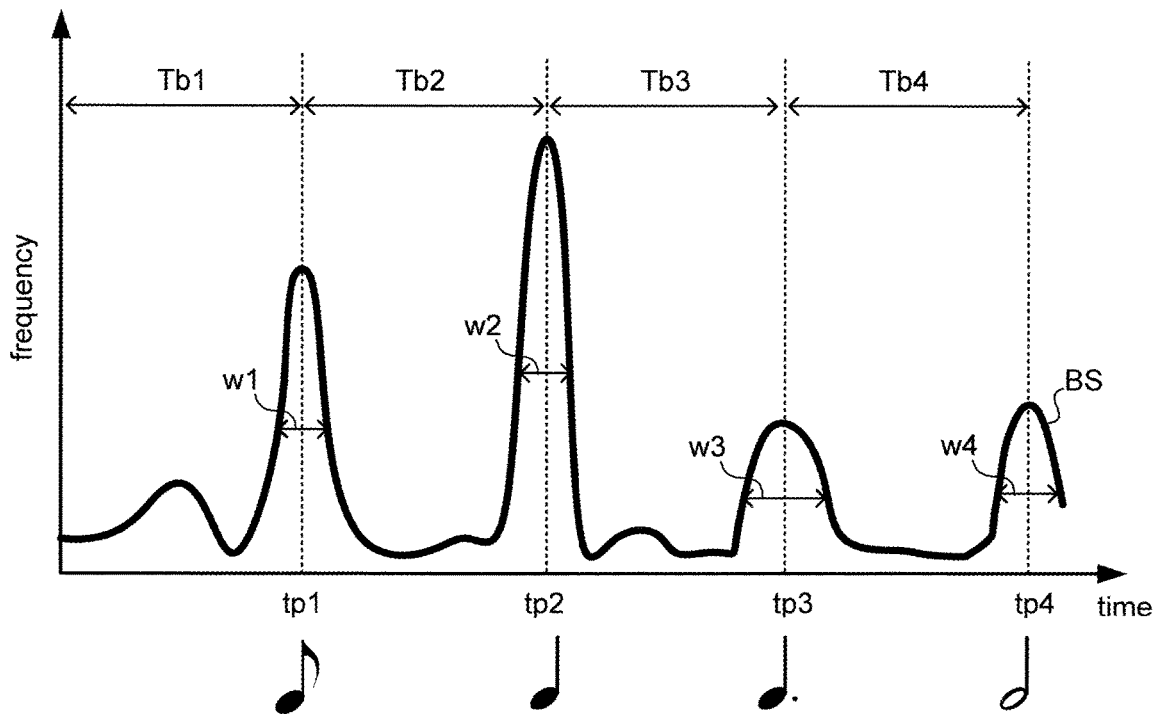
FIG. 4 is a diagram of an example of a frequency distribution of time intervals between adjacent break positions.

FIG. 4 is a diagram of an example of a frequency distribution of time intervals between adjacent break positions. The horizontal axis represents time intervals between adjacent break positions, and the vertical axis represents frequency. When a frequency distribution of time intervals is taken in this manner, cyclic peaks appear. In this example, peaks appear at times tp1, tp2, tp3, and tp4. When tp1 corresponds to the length of an eighth note, tp2 corresponds to the length of a quarter note, tp3 corresponds to a dotted quarter note, and tp4 corresponds to a half note. Therefore, when each peak is shifted from an integral multiple of tp1, this indicates that the singing rhythm is shifted. When a peak is present at a time shorter than tp1, it is desirable to make a determination by taking a peak in the shortest time as a reference. This is because, for example, when a peak is present at a position of a half of tp1, a peak other than that at an integral multiple of tp1 also tends to appear, that is, at 1.5 times and 2.5 times thereof.

Also, even if the peak is not shifted, it is indicated that the singing rhythm is more unstable as the width (for example, half-widths (half widths at half maximum) W1, W2, W3, and W4) of each peak is larger. In this manner, the evaluation value calculation unit 107 calculates an evaluation value in accordance with the positional relation of the peaks described above (for example, variance of peak intervals) and the width of each peak (for example, peak variance or half-width). For example, an evaluation value is calculated so that, as the peak intervals are more similar and the peak width is narrower, regularity is higher, that is, the sense of rhythm is better. Note that evaluation may be made by precluding a peak spread due to a dotted note or the like by using an autocorrelation coefficient of the frequency distribution or using a comb filter. When an autocorrelation coefficient is used, a tempo may be further estimated based on the coefficient and a peak interval.

In this manner, according to the evaluation device 1 achieving the rhythm evaluation function 100, even if singing with sounds of a plurality of characters consecutively emitted is included, a break position corresponding to the starting point of each sound can be detected from a change of the sound-volume level of the singing voice. According to the evaluation device 1, this allows evaluation of the sense of rhythm of the singer to be made by calculating an evaluation value regarding the degree of regularity of a plurality of break positions even without using data serving as a reference for comparison such as a model sound for each musical piece. Note that the result based on this evaluation value may be presented in the display unit 17.

[Influences by Threshold Vth]

Here, regarding the threshold Vth of the sound-volume level, influences of a lowly-set threshold Vthb and a highly-set threshold Vthu are described.

FIG. 5 is a diagram describing an example in which the threshold is low in the evaluation method in the first embodiment of the present invention. As depicted in FIG. 5, when the relatively-low threshold Vthb is adopted, it is difficult to detect a break position of each sound in a consecutive sound emission section. As a result, a break position is detected for a plurality of collective sounds. For example, detection is made as a large unit, such as for each phrase. In the example of FIG. 5, for example, break positions are detected at ts5 and ts6, and an interval therebetween is Tw5. Even with this detection result, if detection of a break position corresponding to the above Tw1 can be made in part of the section, it is possible to determine the degree of the sense of rhythm depending on the degree of Tw5 being shifted from an integral multiple of Tw1.

FIG. 6 a diagram describing an example in which the threshold is high in the evaluation method in the first embodiment of the present invention. As depicted in FIG. 6, when the relatively high threshold Vthu is adopted, a sound at a small sound-volume level is not detected. As a result, part of the break positions of the respective sounds in a consecutive sound emission section is not detected. The time interval between the break positions may be increased, or the frequency when a frequency distribution is taken is decreased. FIG. 6 depicts an example in which ts7 and ts8 are detected and an interval therebetween is Tw7. This Tw7 corresponds to Tw3 in FIG. 3.

In this manner, it is required to appropriately set the threshold Vth. However, even if the threshold is shifted, the frequency is decreased, and a break position is detected by taking a plurality of sounds as a unit, and therefore the influence on the result is small. Note that the threshold Vth described above may be preliminarily set at a plurality of values and a break position may be detected for each. Then, with reference to the detected break positions, a value to be formally set as the threshold Vth may be determined with a predetermined method. For example, the threshold Vth may be a value with which the result of calculation of the evaluation value is the highest or may be a value with which the number of peaks with predetermined frequencies or more is the largest when a frequency distribution is calculated. In this manner, the threshold Vth can be variously set. Any setting by following a rule determined in advance may be determined.

Second Embodiment

In a second embodiment, described is a rhythm evaluation function 100A including a function of removing an oscillation frequency band of part of a singing voice before a sound-volume level is calculated at the feature value calculation unit 103.

Figure 7:
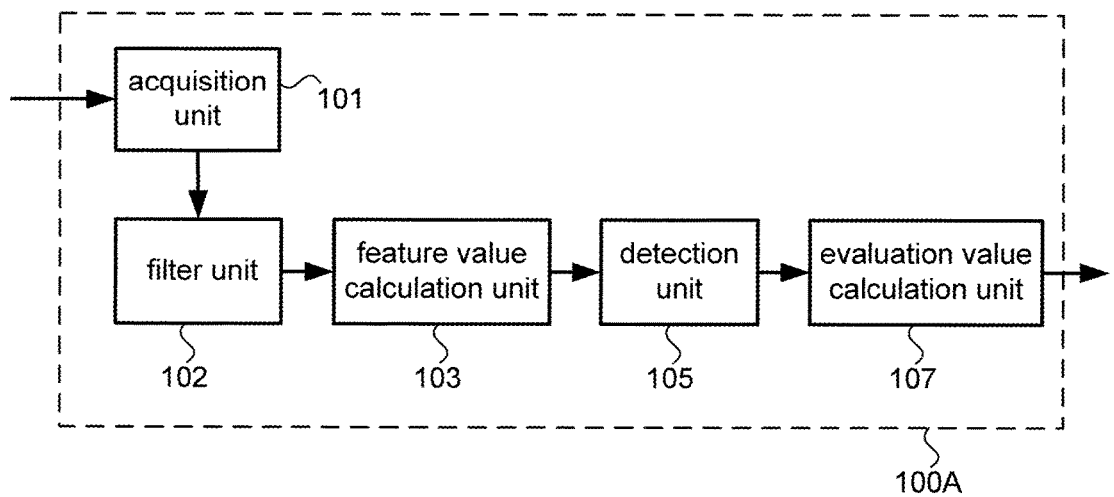
FIG. 7 is a block diagram depicting the structure of a rhythm evaluation function in a second embodiment of the present invention.

FIG. 7 is a block diagram depicting the structure of the rhythm evaluation function in the second embodiment of the present invention. As described above, the rhythm evaluation function 100A includes a filter unit 102 which removes an oscillation frequency band of part of a singing voice indicated by the singing voice data acquired by the acquisition unit 101. In this example, the filter unit 102 is a low-pass filter or band-pass filter, removing a high frequency component of the singing voice. The feature value calculation unit 103 receives an input of data indicating a singing voice of a specific oscillation frequency band with the high frequency component removed and calculates a sound-volume level. This sound-volume level corresponds to power of the specific oscillation frequency band. The consonant includes more harmonic components and noise components for a fundamental tone, compared with the vowel. Therefore, by removing the high frequency component, a difference in the sound-volume level between the consonant and the vowel can be expanded.

Figure 8:
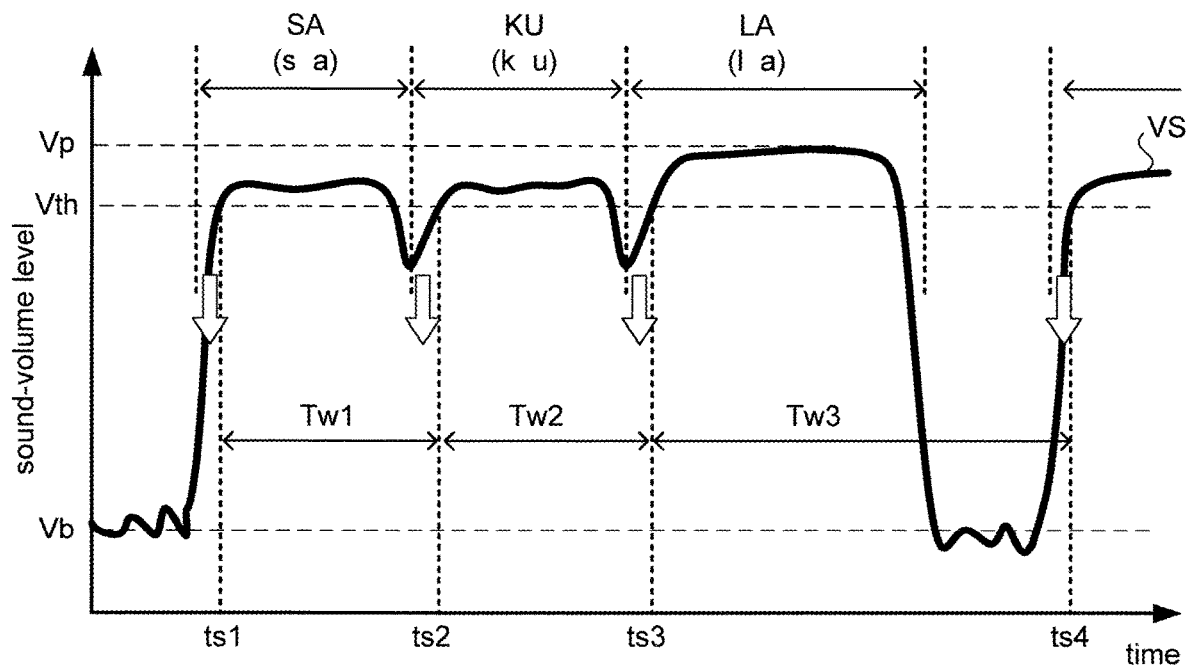
FIG. 8 is a diagram describing an evaluation method in the second embodiment of the present invention.

FIG. 8 is a diagram describing an evaluation method in the second embodiment of the present invention. With the presence of the filter unit 102, as depicted in FIG. 8, the sound-volume level of an initial portion (consonant portion) of each sound is decreased relatively significantly, compared with the sound-volume level of another portion. This widens a margin of the threshold Vth with which a break position of each sound can be accurately detected. Also, in a language other than Japanese, for example, in Chinese, the difference in the sound-volume level between the consonant and the vowel is small. By applying the filter unit 102 to such a language, the sound-volume level of a consonant portion can be decreased, facilitating detection of a break position. Note that the method of detecting a break position using a sound-volume level when the filter unit 102 is not applied as in the first embodiment, that is, when filtering to a specific oscillation frequency band is not performed, may be performed together with the detection method in the second embodiment.

Third Embodiment

In the above embodiments, a break position of each sound is detected by using a decrease in the sound-volume level in the consonant even for consecutive sounds. In a third embodiment, described is a rhythm evaluation function 100B which allows a break position to be detected even if a sound with only a vowel and without a consonant is included. First, in this situation, an example is described when a break position is detected by the rhythm evaluation function 100 of the first embodiment.

Figure 9:
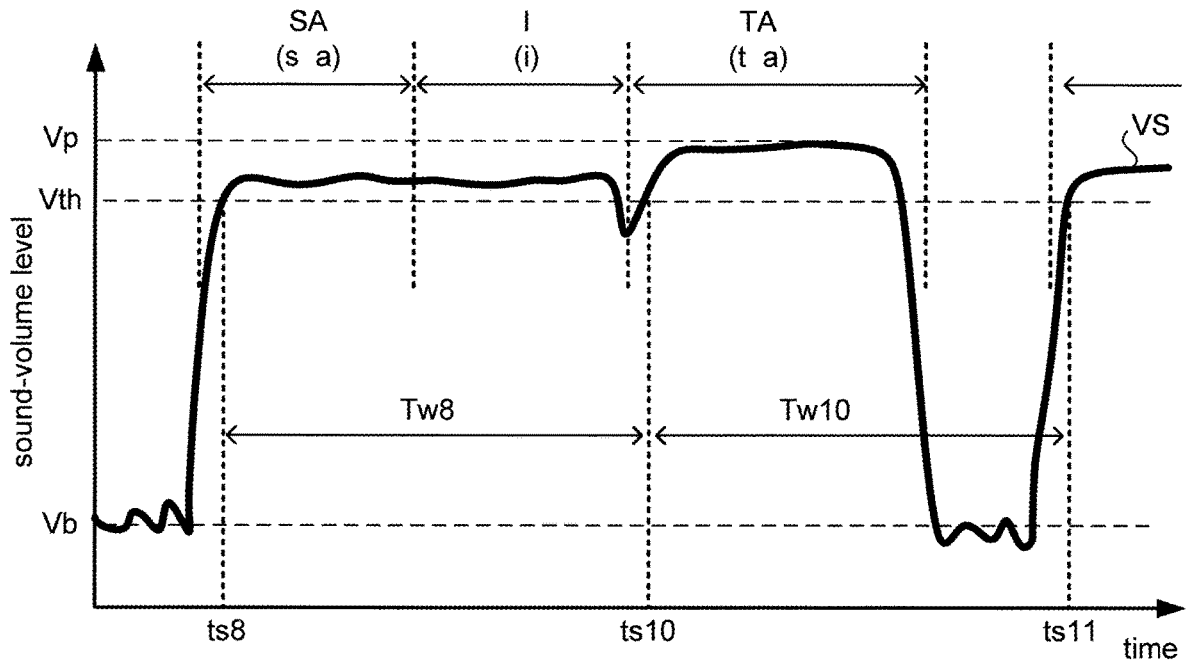
FIG. 9 is a diagram describing an example in which a song lyric not including a consonant is included in the evaluation method in the first embodiment of the present invention.

FIG. 9 is a diagram describing an example in which a song lyric not including a consonant is included in the evaluation method in the first embodiment of the present invention. Here, an example is depicted in which the song lyric is "sa (consonant "s"+vowel "a")", "i (vowel "i")", and "ta (consonant "t"+vowel "a")". Therefore, there is no consonant between "sa" and "i", no decrease in the sound-volume level is seen. Therefore, in the rhythm evaluation function 100 in the first embodiment, break positions are detected at ts8, ts10, and ts11, and no break position corresponding to the starting point of the sound "i" is detected. Therefore, time intervals of the break positions for use in taking a frequency distribution are Tw8 and Tw10. In such a case, in the third embodiment, detection of a break position is tried by a further different method. In the following, the rhythm evaluation function 100B in the third embodiment of the present invention is described.

Figure 10:
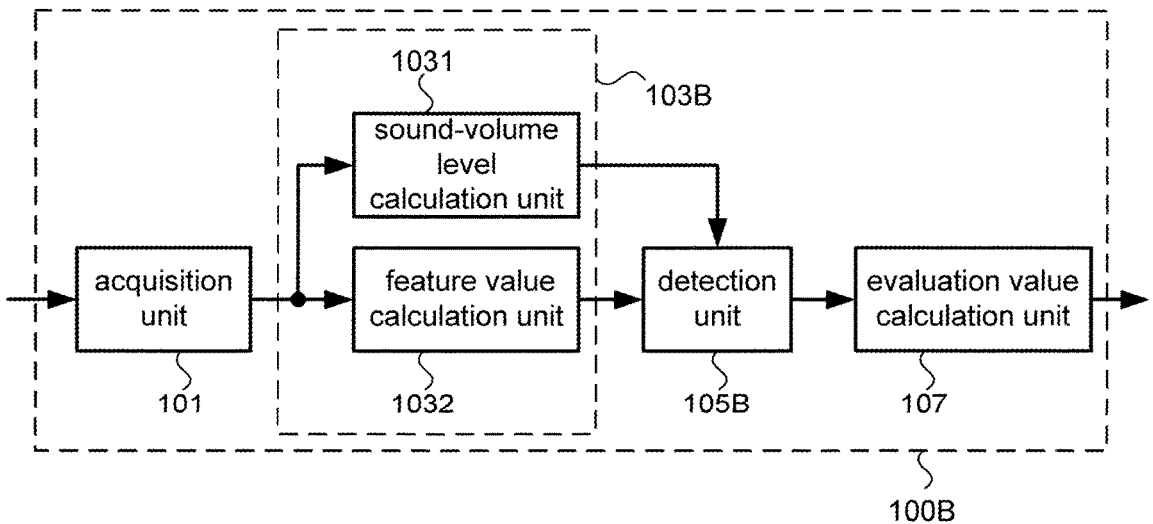
FIG. 10 a block diagram depicting the structure of a rhythm evaluation function in a third embodiment of the present invention.

FIG. 10 a block diagram depicting the structure of the rhythm evaluation function in the third embodiment of the present invention. In this example, a feature value calculation unit 103B includes a sound-volume level calculation unit 1031 and an oscillation frequency distribution calculation unit 1032 which correspond to the function of the feature value calculation unit 103 in the first embodiment. In the oscillation frequency distribution calculation unit 1032, the singing voice data acquired at the acquisition unit 101 is analyzed, a temporal change of an oscillation frequency distribution is calculated by using FFT (Fast Fourier Transform), and, furthermore, an SN ratio of the oscillation frequency distribution is calculated. The SN ratio of the oscillation frequency distribution is described.

Figure 11:
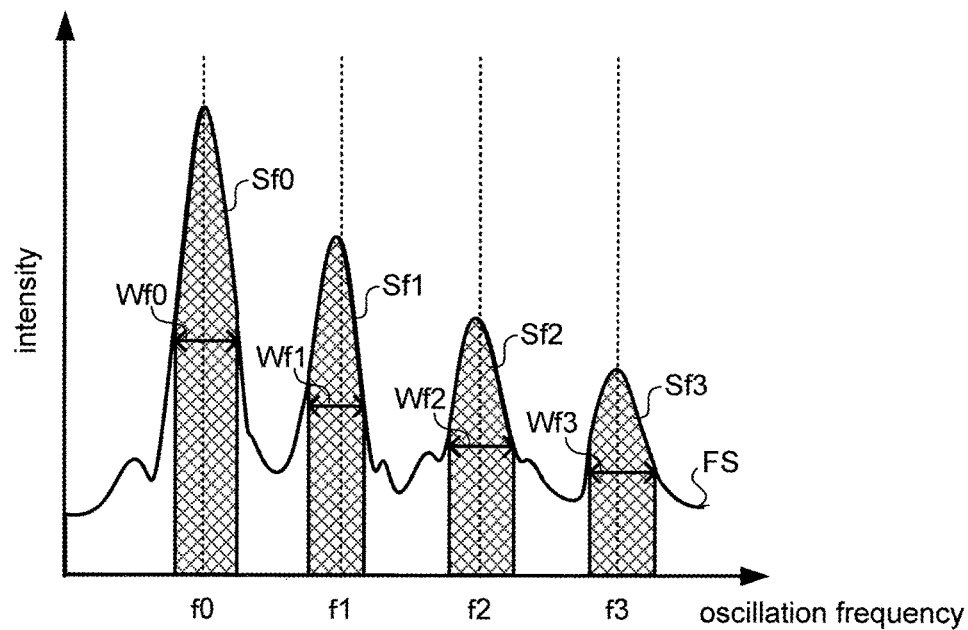
FIG. 11 is a diagram describing an SN ratio for use in the third embodiment of the present invention.

FIG. 11 is a diagram describing an SN ratio for use in the third embodiment of the present invention. A spectrum FS of an oscillation frequency distribution of a singing voice includes a fundamental tone f0 as well as harmonics of integral multiples f1, f2, . . . as peaks. At the respective peaks, integral values of regions included in half-widths Vf0, Vf1, Vf2, . . . (hatched portions) are taken as signals S (Sf0, Sf1, Sf2, . . . ), and other portions are taken as noise N, and S/N is taken as an SN ratio for calculation. Here, for example, with a range being set up to the peak of a predetermined harmonic (for example, third harmonic), an SN ratio is calculated in a predetermined oscillation frequency range.

The detection unit 105B detects a break position by using the sound-volume level calculated at the sound-volume level calculation unit 1031 and the SN ratio calculated at the oscillation frequency distribution calculation unit 1032.

Figure 12:
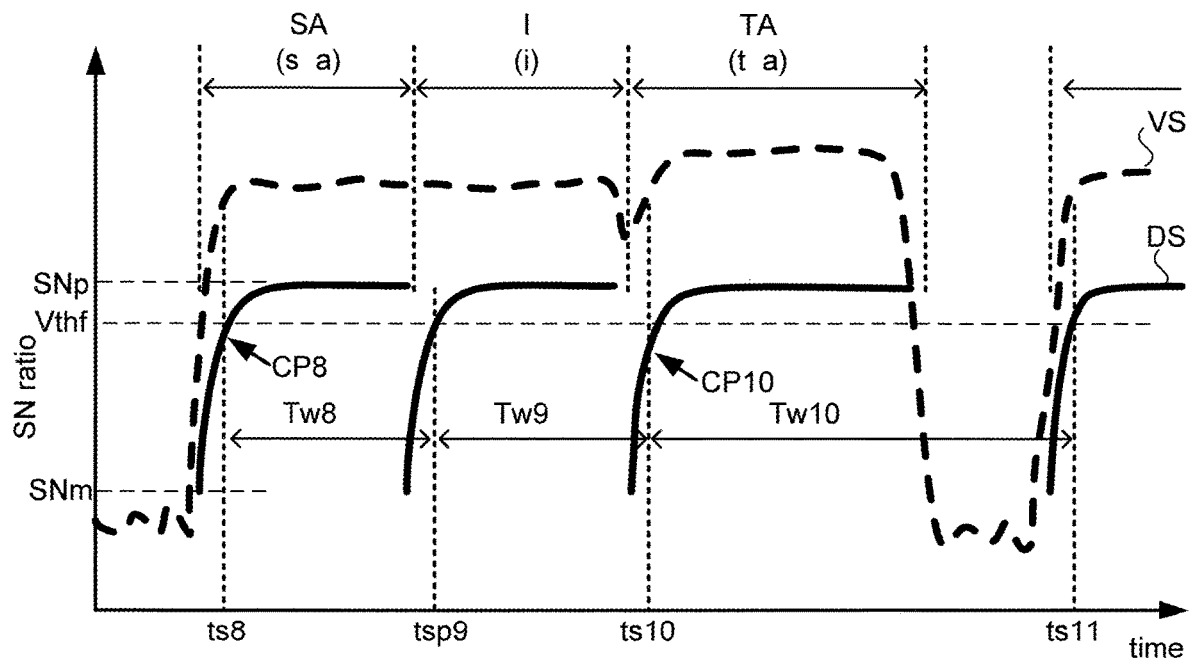
FIG. 12 is a diagram describing an evaluation method in the third embodiment of the present invention.

FIG. 12 is a diagram describing an evaluation method in the third embodiment of the present invention. The SN ratio calculated as described above has a tendency to be low at the start of each sound (with many noise N components) and then abruptly increase, as indicated by a spectrum DS. Even the SN ratio of a sound only with a vowel has this tendency. When detecting a break position by using the SN ratio, the detection unit 105B uses this tendency.

Based on the sound-volume level, the detection unit 105B detects a break position by a method similar to that of the first embodiment. Then, the detection unit 105B detects a break position that cannot be detected by using the sound-volume level, that is, another break position between adjacent break positions, by using the SN ratio. For example, the detection unit 105B determines a predetermined threshold Vthf for the SN ratio. Then, the detection unit 105B detects, as a break position, a position where the SN ratio decreases by a ratio determined in advance or more and is then changed to increase, in this example, a position where the SN ratio makes a transition from a lower value to a higher value than Vthf. Here, a break position is detected only at a position shifted from the break position detected based on the sound-volume level by a predetermined time or more. For example, in the example of FIG. 12, "tsp9" is detected as a break position based on the SN ratio. In this example, "ts8" and "ts10" are close to the break position and are thus not detected as break positions based on the SN ratio. As a result, time intervals between adjacent break positions are "Tw8", "Tw9", and "Tw10".

The threshold Vthf may be determined based on a minimum value and a maximum value of the SN ratio. It is only required that the threshold be determined by a predetermined arithmetic expression, for example, Vthf=SNp×0.9 (SNp−SNm) when the minimum value is SNm and the maximum value is SNp. Note that the threshold may be determined as described below. At either of the break positions determined based on the sound-volume level (in the example of FIG. 12, "ts8" and "ts10"), the level of the SN ratio (in the example of FIG. 12, CP 8 for the break position "ts8") may be taken as the threshold Vthf. Also, the threshold Vthf may be updated every time the level reaches a break position determined based on the sound-volume level. For example, in a section after the level passes "ts8" until it passes "ts10", an SN ratio CP8 at the time of "ts8" is taken as a threshold Vthf8. In a section after "ts10", an SN ratio CP10 at the time of "ts10" is taken as a threshold Vthf10. This allows an indirect correlation at the threshold Vth and the threshold Vthf. As a result, even if break positions are detected by different methods, regularity of the break positions can be evaluated without correcting that difference in method.

In this manner, even if a sound only with a vowel is included in consecutive sounds and a break position that cannot be detected by the rhythm evaluation function 100 based on the sound-volume level is present, that break position can be detected by using the rhythm evaluation function 100B using the SN ratio. Note that at the time of detection of a break position by using the SN ratio, detection of a break position by using the sound-volume level is not necessarily used together. In this case, the sound-volume level calculation unit 1031 is unnecessary. Detection of a break position based on the sound-volume level at the detection unit 105B is also unnecessary. On the other hand, in the structure of the third embodiment, detection of a break position by the structure of the second embodiment (power of a specific oscillation frequency band) may be used together.

Fourth Embodiment

In a fourth embodiment, described is an example when evaluation of a singing voice is performed also for a purpose other than the sense of rhythm. In this example, described is an example in which a change in pitch of a singing voice is also evaluated. Here, in particular, described is a structure when a comparison target for the pitch of the singing voice is not a melody of a musical piece, that is, when evaluation of the pitch of the singing voice is enabled without depending on the melody of the musical piece.

In this example, evaluation reference information further includes information to be used by the evaluation function as a reference of evaluation of the singing voice. For example, the evaluation reference information includes information for specifying a change in singing pitch for detecting a singing methodology (singing pitch wave). For example, for singing methodologies such as vibrato, riffs and runs (kobushi), bend-up (shakuri), and bend-down (fall), singing pitch waves are as follows.

(1) Vibrato: The pitch is finely changes up and down (at a predetermined cycle or lower). A specific example of vibrato detection is disclosed in Japanese Patent Application Laid-Open No. 2005-107087.

(2) Riffs and runs: The pitch temporarily increases (within a predetermined time) and then returns to the original pitch. A specific example of riffs-and-runs detection is disclosed in Japanese Patent Application Laid-Open No. 2008-268370.

(3) Bend-up: The pitch increases for a predetermined time and then becomes stable. A specific example of bend-up detection is disclosed in Japanese Patent Application Laid-Open No. 2005-107334.

(4) Bend-down: The pitch decreases for a predetermined time, and then the singing interrupts. A specific example of bend-down detection is disclosed in Japanese Patent Application Laid-Open No. 2008-225115.

Figure 13:
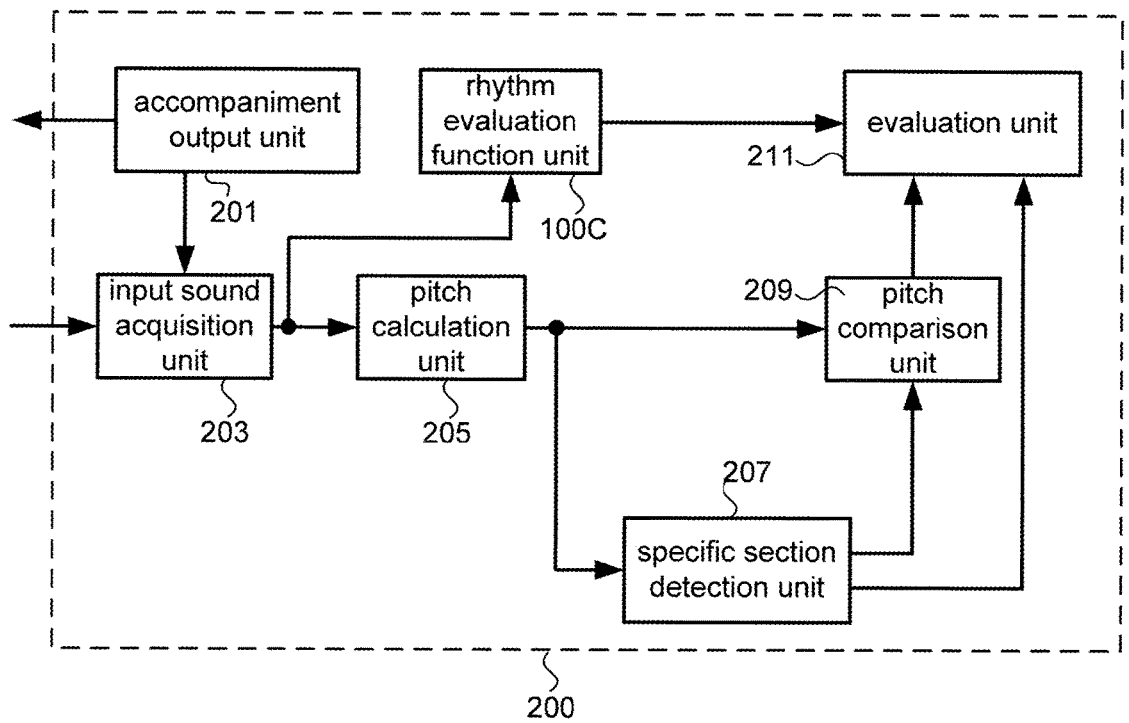
FIG. 13 is a block diagram depicting the structure of an evaluation function in a fourth embodiment of the present invention.

FIG. 13 is a block diagram depicting the structure of an evaluation function in the fourth embodiment of the present invention. An evaluation function 200 includes a rhythm evaluation function unit 100C with a function equivalent to that of the rhythm evaluation function 100 described above, and further includes an accompaniment output unit 201, an input sound acquisition unit 203, a pitch calculation unit 205, a specific section detection unit 207, a pitch comparison unit 209, and an evaluation unit 211. The accompaniment output unit 201 reads accompaniment data corresponding to a singing musical piece specified by the singer and causes an accompaniment sound to be outputted from the loudspeaker 25 via the signal processing unit 21.

The input sound acquisition unit 203 acquires singing voice data indicating singing voice inputted from the microphone 23. In this example, an input sound to the microphone 23 in a period in which the accompaniment sound is being outputted is recognized as a singing voice of an evaluation target. Note that while the input sound acquisition unit 203 acquires singing voice data buffered in the storage unit 13, it may acquire the data after singing voice data of the entire musical piece is stored in the storage unit 13 or may acquire the data directly from the signal processing unit 21. Note that the singing voice data acquired by a function corresponding to the acquisition unit 101 in the rhythm evaluation function unit 100C is identical to the singing voice data acquired by the input sound acquisition unit 203.

The pitch calculation unit 205 analyzes the singing voice data acquired by the input sound acquisition unit 203 and calculates a temporal change of the singing pitch (oscillation frequency), that is, a singing pitch waveform. Specifically, a singing pitch waveform is calculated by a known method such as a method using zero cross of the waveform of the singing voice or a method using FFT. Note that when the rhythm evaluation function of the rhythm evaluation function unit 100C corresponds to the rhythm evaluation function 100B in the third embodiment, a singing pitch may be calculated by using the oscillation frequency distribution acquired at the oscillation frequency distribution calculation unit 1032.

The specific section detection unit 207 analyzes a singing pitch waveform and detects a section (specific section) including the singing methodology defined by the evaluation reference information from among singing-voice input periods. The specific section detected at this time may be associated with each type of singing methodology.

The pitch comparison unit 209 sets, as an evaluation section, a section except the specific section detected at the specific section detection unit 207 from among the singing-voice input periods. The pitch comparison unit 209 compares the singing pitch waveform in the evaluation section with a reference pitch. As a comparison result, in this example, a degree of mismatch between the singing pitch waveform and the reference pitch is calculated. A plurality of reference pitches are present at 100-cent intervals. Therefore, from among the plurality of reference pitches, a reference pitch closest to the singing pitch is selected as a comparison target of the singing pitch. A degree of mismatch is calculated so as to be higher as the difference between the singing pitch waveform and the reference pitch is larger. For example, a difference between a singing pitch and a reference pitch in each sample of the singing pitch waveform is added in the evaluation section, and the addition value is divided by the number of samples in the evaluation section, thereby calculating the degree of mismatch.

In this manner, singing evaluation can be performed without depending on melody. Also, in this example, the singing pitch and the reference pitch are compared not in the entire input period of the singing voice but in the section except the specific section. Therefore, it is also possible to prevent an intentional shift of the singing pitch due to the singing methodology in the specific section from increasing the degree of mismatch.

Based on the evaluation value regarding the sense of rhythm of singing outputted from the rhythm evaluation function unit 100C (evaluation value outputted from the evaluation value calculation unit 107) and the comparison result at the pitch comparison unit 209, the evaluation unit 211 calculates an evaluation value as an index for evaluation of the singing voice. In this example, a higher evaluation value is calculated, and evaluation of the singing voice is higher as the degree of mismatch calculated at the pitch comparison unit 209 is lower and the evaluation value outputted from the rhythm evaluation function unit 100C indicates a higher sense of rhythm.

Note that the evaluation unit 211 may calculate an evaluation value further based on another element. As another element, another parameter extractable from the singing methodology and the singing voice data can be assumed. To reflect a singing methodology to the evaluation value, it is only required that the singing methodology corresponding to the specific section detected at the specific section detection unit 207 be used. Another parameter may be, for example, a sound-volume change. If the sound-volume change is used, evaluation can be performed also on a cadence of singing. The evaluation result by the evaluation unit 211 may be presented at the display unit 17.

Figure 14:
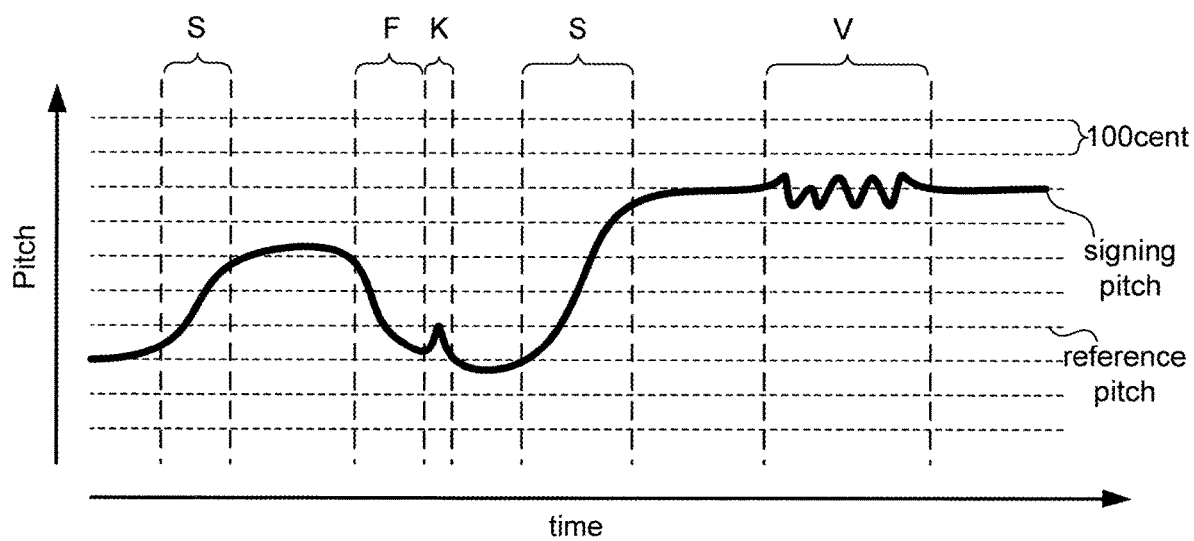
FIG. 14 is a diagram describing an evaluation method in the fourth embodiment of the present invention.

An evaluation method of the singing voice by the evaluation function 200 described above is described by using an example of a specific singing pitch depicted in FIG. 14.

FIG. 14 is a diagram describing the evaluation method in the fourth embodiment of the present invention. A waveform depicted in FIG. 14 is an example of a signing pitch waveform in part of singing. The vertical axis represents pitch. Dotted lines arranged for each 100 cents in a pitch direction represent a plurality of reference pitches. The horizontal axis represents a lapse of time. The specific section detection unit 207 detects a specific section where a singing methodology is present from the singing pitch wave. Depicted in FIG. 14 are a section S which is a specific section corresponding to "bend-up (shakuri)", a section F which is one corresponding to "bend-down (fall)", a section K which is one corresponding to "riffs and runs (kobushi)", and a section V which is one corresponding to "vibrato". Therefore, evaluation sections are the sections except the specific sections corresponding to the sections S, F, K, and V.

The degree of mismatch calculated at the pitch comparison unit 209 corresponds to an addition value of a difference between a singing pitch and a reference pitch in each sample. In the section V, this addition value is large due to a feature of a pitch change of vibrato. Therefore, when the section V is included as a target for comparison between the singing pitch and the reference pitch, in spite of rich singing using the vibrato singing methodology, a large degree of mismatch may be calculated to degrade evaluation of singing. Even in this case, if a comparison is made between the singing pitch and the reference pitch in an evaluation section except the specific sections including the section V as in the evaluation device 1 in the present embodiment, the use of the singing methodology can prevent evaluation from being degraded.

In the specific section, when the singing pitch makes a specific change, a change in the sound-volume level different from that of normal singing may occur. Thus, for evaluation of the sense of rhythm at the rhythm evaluation function unit 100C, a specific section using a specific singing methodology may be a non-target for evaluation. For example, a break position in the specific section may not be reflected onto the frequency distribution calculated by the evaluation value calculation unit 107.

Other Embodiments

In the third embodiment, by calculating an SN ratio based on the oscillation frequency distribution of the singing voice data, a break position is detected based on the SN ratio. A break position may be detected by using thus acquired oscillation frequency distribution for another use purpose. For example, a pitch of the singing voice may be calculated based on the oscillation frequency distribution of the singing voice and a break position may be detected based on the pitch. For example, a break position may be detected based on a position where a pitch change occurs by a width determined in advance or more. This is because the position where the pitch significantly changes often has a different sound.

Also, a break position may be detected based on a position where the intensity of the fundamental tone f0 in the oscillation frequency distribution is changed from a lower level to a higher level than a threshold determined in advance. This is because the position where the intensity of the fundamental tone f0 is changed from a low level to a high level often has a new sound emission. Note that these methods of detecting a break position can be used together with the method of detecting a break position in each of the embodiments described above. Also, each detection method can be singly used. For example, a break position may be detected based on the pitch or the fundamental tone f0 without using the sound-volume level.

While a break position is detected based on the relation between the sound-volume level and the threshold Vth in the first embodiment, a break position may be detected based on the sound-volume level and another parameter. For example, the detection unit 105 specifies a region in which fluctuations in the sound-volume level are within a predetermined range (flat region). Then, when a dip region lower than the sound-volume level is arranged between a plurality of flat regions, a break position may be detected immediately after the dip region.

The sound indicated by the singing voice data acquired by the input sound acquisition unit 203 is not limited to a voice of the singer and may be a voice by singing synthesis or a musical instrument sound. In the case of a musical instrument sound, a single-note performance is desirable. Note that, in the case of a musical instrument sound, the concept of consonants and vowels is not present, but there is a tendency similar to that of singing at the starting point of sound emission of each sound, depending on the performance method. Therefore, it may be possible to make similar determination also for a musical instrument sound. Also, detection of a break position based on the pitch and detection of a break position based on the fundamental tone f0 described above can be applied also to a musical instrument sound. In particular, in a musical instrument in a structure in which the pitch cannot be consecutively changed (such as clarinet or trumpet), the pitch often changes in a stepwise manner in units of 100 cents. Therefore, detection of a break position is easy.

Also, with operation of a musical instrument, unique noise may be included in the musical instrument sound. For example, there may be the case in which an operation sound of a piston of a trumpet is included in the musical instrument sound as noise. There may be the case in which such noise is included in a specific oscillation frequency band. Thus, as with the second embodiment, a break position may be detected by taking, as a reference, for example, a timing when the sound-volume level in a specific oscillation frequency band (power of a specific oscillation frequency band) reaches a peak or a timing when the level is increased to exceed a predetermined threshold. Also, the noise described above may have a characteristic change in the SN ratio described in the third embodiment. Thus, as with the third embodiment, a break position may be detected by detecting a characteristic change of the SN ratio.

REFERENCE SIGNS LIST

1 . . . evaluation device, 11 . . . control unit, 13 . . . storage unit, 15 . . . operating unit, 17 . . . display unit, 19 . . . communication unit, 21 . . . signal processing unit, 23 . . . microphone, 25 . . . loudspeaker, 100 . . . rhythm evaluation function, 101 . . . acquisition unit, 102 . . . filter unit, 103 . . . feature value calculation unit, 105 . . . detection unit, 107 . . . evaluation value calculation unit, 200 . . . evaluation function, 201 . . . accompaniment output unit, 203 . . . input sound acquisition unit, 205 . . . pitch calculation unit, 207 . . . specific section detection unit, 209 . . . pitch comparison unit, 211 . . . evaluation unit, 1031 . . . sound-volume level calculation unit, 1032 . . . oscillation frequency distribution calculation unit

What is claimed is:

1. An evaluation device comprising:
a memory storing instructions; and
a processor that implements the instructions to execute a plurality of tasks, including:
an acquisition task that acquires an input sound;
a feature value calculation task that calculates a feature value from the input sound acquired by the acquisition task;
a detection task that detects a break position corresponding to a starting point of each sound included in the input sound acquired by the acquisition task based on the feature value calculated by the feature value calculation task; and
an evaluation value calculation task that calculates, based on time intervals between adjacent break positions among a plurality of break positions detected by the detection task, an evaluation value regarding a degree of temporal regularity of the plurality of break positions.

2. The evaluation device according to claim 1, wherein:
the feature value includes a value corresponding to a sound-volume level of the input sound, and
the detection task detects the break position further based on a position where the sound-volume level corresponding to the feature value makes a transition from a lower level to a higher level than a predetermined threshold.

3. The evaluation device according to claim 2, wherein the detection task, to detect the break position, changes the threshold by following a predetermined rule for each predetermined section.

4. The evaluation device according to claim 2, wherein the sound-volume level is a sound-volume level of the input sound in a predetermined oscillation frequency band.

5. The evaluation device according to claim 1, wherein:
the feature value includes a value corresponding to an SN ratio of an oscillation frequency distribution of the input sound, and
the detection task detects the break position further based on a position where the SN ratio decreases by a predetermined ratio or greater and then increases.

6. The evaluation device according to claim 1, wherein:
the feature value includes a value corresponding to an oscillation frequency distribution of the input sound, and
the detection task detects the break position further based on a position where an intensity of a fundamental tone of the oscillation frequency distribution is changed from a lower intensity to a higher intensity than a predetermined threshold.

7. The evaluation device according to claim 1, wherein:
the feature value includes a value corresponding to a pitch of the input sound, and
the detection task detects the break position further based on a position where a change in the pitch is changed by a predetermined width or greater.

8. The evaluation device according to claim 1, further comprising:
an accompaniment output task that outputs an accompaniment sound,
wherein the acquisition task acquires the input sound during a period where at least the accompaniment sound is output.

9. An evaluation method comprising:
acquiring an input sound;
calculating a feature value from the acquired input sound;
detecting a break position corresponding to a starting point of each sound included in the acquired input sound based on the calculated feature value; and
calculating, based on time intervals between adjacent break positions among a plurality of detected break points, an evaluation value regarding a degree of temporal regularity of the plurality of detected break positions.

10. The evaluation method according to claim 9, wherein:
the feature value includes a value corresponding to a sound-volume level of the input sound, and
the detecting of the break position detects the break position further based on a position where the sound-volume level corresponding to the feature value makes a transition from a lower level to a higher level than a predetermined threshold.

11. The evaluation method according to claim 10, wherein the detecting of the break position, to detect the break position, changes the threshold by following a predetermined rule for each predetermined section.

12. The evaluation method according to claim 10, wherein the sound-volume level is a sound-volume level of the input sound in a predetermined oscillation frequency band.

13. The evaluation method according to claim 9, wherein:
the feature value includes a value corresponding to an SN ratio of an oscillation frequency distribution of the input sound, and the detecting of the break position detects the break position further based on a position where the SN ratio decreases by a predetermined ratio or greater and then increases.

14. The evaluation method according to claim 9, wherein:
the feature value includes a value corresponding to an oscillation frequency distribution of the input sound, and
the detecting of the break position detects the break position further based on a position where an intensity of a fundamental tone of the oscillation frequency distribution is changed from a lower intensity to a higher intensity than a predetermined threshold.

15. The evaluation method according to claim 9, wherein:
the feature value includes a value corresponding to a pitch of the input sound, and
the detecting of the break position detects the break position further based on a position where a change in the pitch is changed by a predetermined width or greater.

16. The evaluation method according to claim 9, further comprising:
outputting an accompaniment sound,
wherein the acquiring of the input sound acquires the input sound during a period where at least the accompaniment sound is output.

* * * * *